United States Patent
Carley et al.

(10) Patent No.: US 12,409,712 B2
(45) Date of Patent: Sep. 9, 2025

(54) RETRACTABLE COVER ASSEMBLY

(71) Applicant: Prodinteg LLC, Caledonia, MS (US)

(72) Inventors: Tony Carley, Caledonia, MS (US); Lesly Wozniak, Columbus, MS (US)

(73) Assignee: Prodinteg LLC, Caledonia, MS (US)

( * ) Notice: Subject to any disclaimer, the term of this patent is extended or adjusted under 35 U.S.C. 154(b) by 264 days.

(21) Appl. No.: 18/119,936

(22) Filed: Mar. 10, 2023

(65) Prior Publication Data
US 2023/0331072 A1    Oct. 19, 2023

Related U.S. Application Data

(60) Provisional application No. 63/318,833, filed on Mar. 11, 2022.

(51) Int. Cl.
*B60J 7/06* (2006.01)

(52) U.S. Cl.
CPC ...................... *B60J 7/06* (2013.01)

(58) Field of Classification Search
CPC ....... E04H 6/04; E04B 1/343; E04B 1/34305; B60J 7/06
USPC .......................................................... 160/39
See application file for complete search history.

(56) References Cited

U.S. PATENT DOCUMENTS

| | | | | |
|---|---|---|---|---|
| 3,745,725 A * | 7/1973 | Boucaud | ............ | E04B 1/34305 |
| | | | | 254/387 |
| 3,845,591 A * | 11/1974 | Stine | ................... | E04B 1/34305 |
| | | | | 160/202 |
| 4,271,644 A * | 6/1981 | Rilliet | ................... | E04B 1/0046 |
| | | | | 52/67 |
| 6,430,879 B1 * | 8/2002 | Nuiry | ................. | E04B 1/34305 |
| | | | | 4/500 |
| 8,171,947 B2 * | 5/2012 | Hardie | .................... | E04H 15/36 |
| | | | | 135/129 |
| 8,359,994 B1 * | 1/2013 | Highfield | ................ | B63B 19/18 |
| | | | | 114/361 |
| 8,967,172 B2 * | 3/2015 | Ying | ....................... | E04H 15/38 |
| | | | | 135/88.06 |
| 9,404,281 B1 * | 8/2016 | Donnay | ................... | E04H 15/52 |
| 10,513,865 B2 * | 12/2019 | Petrenko | ................. | E04H 6/025 |
| 10,794,076 B2 * | 10/2020 | May | ........................... | E04H 6/04 |
| 2003/0145882 A1 * | 8/2003 | Sanna | ...................... | B60J 7/026 |
| | | | | 135/128 |
| 2013/0014793 A1 * | 1/2013 | Gerengi | ................ | F01D 25/285 |
| | | | | 135/141 |
| 2019/0118913 A1 * | 4/2019 | Bejrowski | .............. | E04H 15/36 |

\* cited by examiner

*Primary Examiner* — Beth A Stephan
(74) *Attorney, Agent, or Firm* — Bradley Arant Boult Cummings LLP; Michael Casey Williams; Jessica L. Zurlo

(57) ABSTRACT

A lightweight, fully retractable cover assembly is provided. The retractable cover assembly may be installed on an interior portion of a vehicle. The retractable cover assembly utilizes a rail assembly that allows the cover to slide in and out of the vehicle along the horizontal axis. The retractable cover assembly can be used to protect cargo from inclement weather during the loading and unloading process.

12 Claims, 9 Drawing Sheets

RETRACTABLE COVER ASSEMBLY

CROSS-REFERENCE TO RELATED APPLICATIONS

This application claims the benefit of and priority to U.S. Provisional Application No. 63/318,833, filed on Mar. 11, 2022, and entitled "Retractable Cover Assembly," the disclosure of which is expressly incorporated by reference in its entirety.

TECHNICAL FIELD

The present disclosure relates generally to a retractable cover assembly for attachment to trucks and transport trailers.

BACKGROUND

Protecting cargo from the weather is a major concern of the trucking industry. A trucker may depart a warehouse with cargo loaded and a clear weather forecast, only to encounter inclement weather along the route or at the delivery location. Truck bed covers have gained popularity among many pickup truck owners as a means to protect cargo which may be damaged by wind or weather during transport. The truck bed covers are typically attached to the truck bed or wound on a storage roll mounted on one end of the truck bed and can be unwound or rolled out when the user wishes to protect the cargo. These truck bed covers, however, are designed only for open cargo areas in the back of a pickup truck. There are currently no solutions on the market for large trucks or transport trailers that utilize a lift gate. These trucks are often too large to pull up under a canopy and require the cargo to be loaded or unloaded without any protection from inclement weather or high winds, which can adversely affect the integrity of the packaging and destroy the cargo within the packaging.

Accordingly, there remains a need in the art for a cover mechanism that may be installed in large trucks or trailers and that can protect cargo from inclement weather when such cargo is being loaded or unloaded from the truck.

SUMMARY

The problems expounded above, as well as others, are addressed by the following inventions, although it is to be understood that not every embodiment of the inventions described herein will address each of the problems described above. In some embodiments, the present disclosure provides a lightweight, fully retractable cover assembly that may be installed inside of a truck or trailer. The retractable cover assembly may utilize a guiderail assembly that allows the cover to slide in and out of the truck along the horizontal axis. The retractable cover assembly can be used to protect cargo from inclement weather during the loading and unloading process.

In some embodiments, a retractable cover assembly is provided, the retractable cover assembly including a first support frame having a cover attached thereto, a second support frame attached to the first support frame, the second support frame including a pair of oppositely disposed side rails, each side rail including one or more rollers affixed thereto, a pair of parallel and spaced apart guiderails configured for attachment to a surface, wherein each of the guiderails are structured to receive the one or more rollers in slidable engagement, and wherein the second support frame is configured to slide along the guiderails in a first direction associated with opening of the retractable cover assembly, and in a second direction associated with closing of the retractable cover assembly.

In one embodiment, the first support frame and the second support frame are comprised of a plurality of support rails. In another embodiment, the plurality of support rails and each of the side rails are made of a lightweight metallic tubing. In still another embodiment, the cover is made of a flexible material selected from canvas, neoprene, or a synthetic plastic material. In yet another embodiment, the cover is fastened to the first support frame by screws. In another embodiment, the one or more rollers are affixed to the side rails via a horizontal axle.

In further embodiments, a retractable cover assembly is provided, the retractable cover assembly including a first support frame having a cover attached thereto, the first support frame including a front rail, the front rail including a securable bolt attached thereto and displaceable between a locked position and an unlocked position, a second support frame attached to the first support frame, the second support frame including a pair of oppositely disposed side rails, each side rail including one or more rollers affixed thereto, a pair of parallel and spaced guiderails configured for attachment to a surface and in alignment with each side rail, wherein each of the guiderails are structured to receive the one or more rollers in slidable engagement, and wherein, when the securable bolt is in the unlocked position, the second support frame is configured to slide along the guiderails in a first direction associated with opening of the retractable cover assembly, and in a second direction associated with closing of the retractable cover assembly.

In one embodiment, the securable bolt is a cane bolt, and the cane bolt includes a handle formed integrally therewith and a biasing member for biasing movement of the cane bolt along a horizontal axis. In another embodiment, a cable is provided, the cable having one end attached to the handle and another end hanging freely therefrom. In still another embodiment, the free hanging end of the cable includes a gripping mechanism. In yet another embodiment, each of the guiderails includes an interior track along which the one or more rollers are slidably engaged. In another embodiment, the cover is made of a flexible material selected from canvas, neoprene, or a synthetic plastic material. In still another embodiment, the first support frame includes a pair of oppositely disposed side rails attached to the front rail and a plurality of longitudinally spaced transverse rails attached between the side rails. In yet another embodiment, the second support frame includes s a front rail and a back rail attached to the side rails.

In still further embodiments, a retractable cover assembly is provided, the retractable cover assembly including a first support frame having a cover attached thereto, the first support frame including a front rail, a pair of oppositely disposed side rails attached to the front rail, and a plurality of longitudinally spaced transverse rails attached between the side rails, a second support frame including a front rail attached to the pair of oppositely disposed side rails of the first support frame, a back rail, and a pair of oppositely disposed side rails attached to the front rail and the back rail, wherein each side rail of the second support frame includes two rollers affixed thereto and each roller is affixed to the side rail via a horizontal axle, a pair of parallel and spaced apart guiderails configured for attachment to a surface, wherein each of the guiderails are structured to receive the rollers in slidable engagement, and wherein the second support frame is configured to slide along the guiderails in a first direction associated with opening of the retractable cover assembly, and in a second direction associated with closing of the retractable cover assembly.

In one embodiment, the retractable cover assembly may include a securable bolt attached to the front rail of the first support frame and displaceable between a locked position and an unlocked position. In another embodiment, the cover is made of canvas. In still another embodiment, each of the guiderails comprises an interior track along which the rollers are slidably engaged.

BRIEF DESCRIPTION OF THE DRAWINGS

Further features and advantages can be ascertained from the following detailed description that is provided in connection with the drawings described below.

DETAILED DESCRIPTION

Figure 1A:
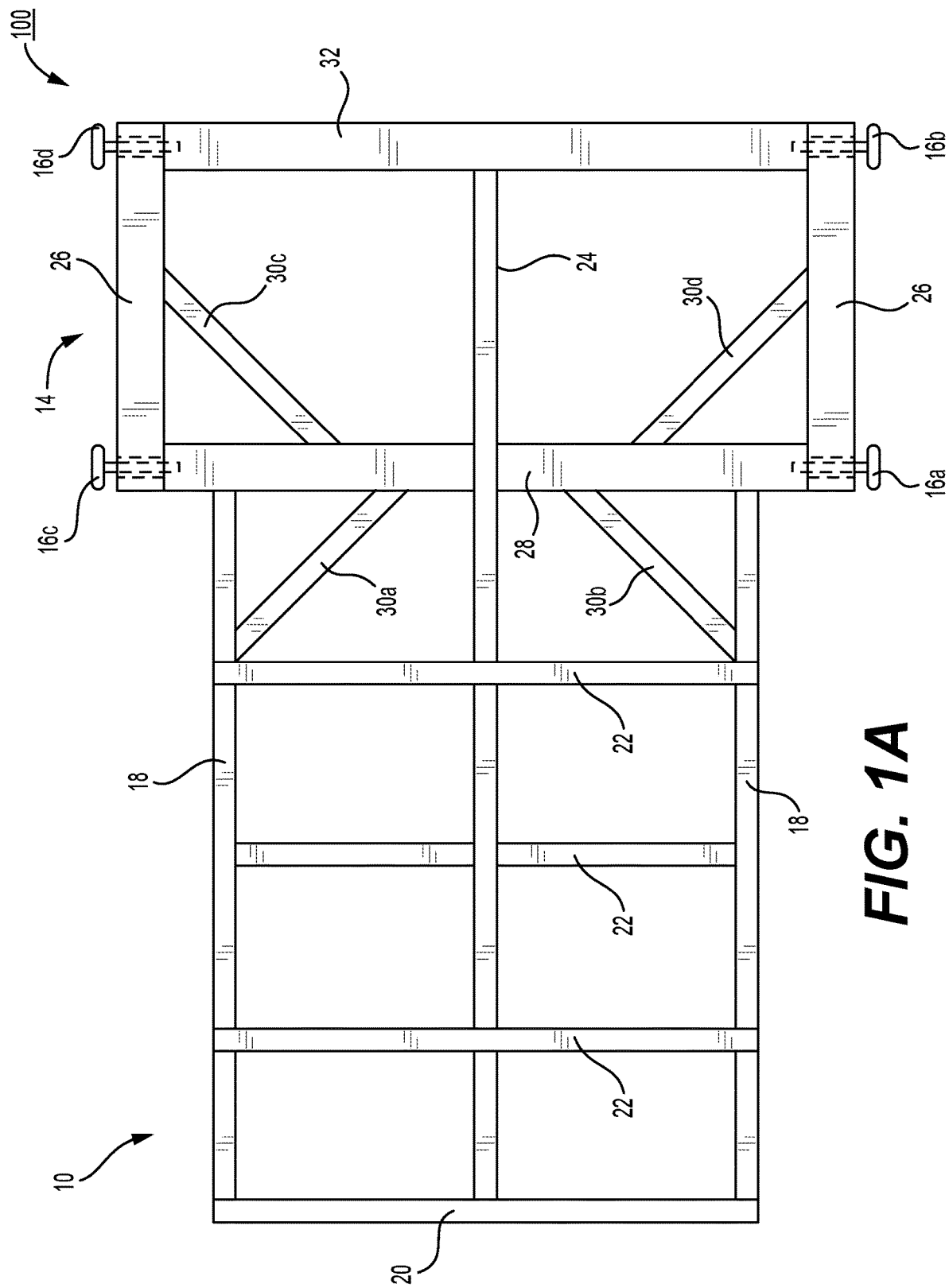
FIG. 1A is a top view of the retractable cover assembly without a covering according to one embodiment of the present disclosure.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural (i.e., "at least one") forms as well, unless the context clearly indicates otherwise.

The terms "first," "second," "third," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Spatially relative terms, such as "above," "under," "below," "lower," "over," "upper," and the like, may be used herein for ease of description to describe one element or feature's relationship to another when the apparatus is right side up as shown in the accompanying drawings.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

Referring to FIGS. 1A-2B, a retractable cover assembly 100 according to one embodiment of the present disclosure is shown. The retractable cover assembly 100 is configured for installation inside any type of vehicle that has a cargo space, such as, for instance, a truck, van, or transport trailer. The retractable cover assembly 100 may be installed in an upper interior portion of the cargo space of the vehicle and is configured to slide out along a rail system within the interior cargo space to protect any cargo (for example, goods or materials) from inclement weather and debris as the cargo is loaded or unloaded. Once the cargo has been unloaded and/or loaded, the retractable cover assembly 100 is configured to slide back into the vehicle along the rail system so that the vehicle door can be closed.

Figure 1B:
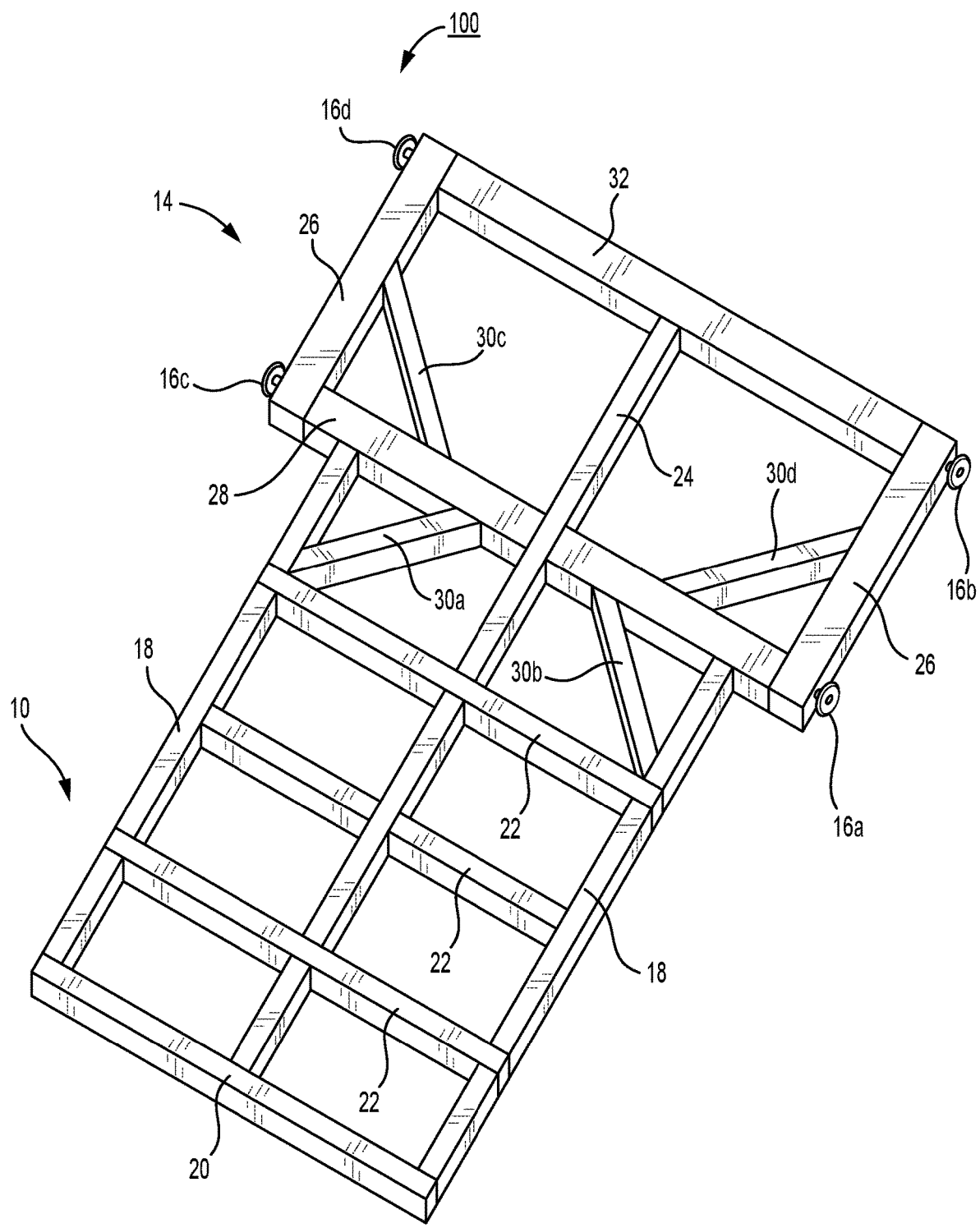
FIG. 1B is a front perspective view of the retractable cover assembly shown in FIG. 1A.

FIGS. 1A and 1B show the structural frame of the retractable cover assembly 100 according to one embodiment. As shown in FIGS. 1A and 1B, the retractable cover assembly 100 includes a first support frame 10 and a second support frame 14 attached to the first support frame 10. The second support frame 14 includes a plurality of rollers 16a-d attached thereto for sliding the retractable cover assembly 100 along a rail system mounted within the interior of the cargo space. As will be described in more detail below, the rollers 16a-d are configured to slide along a pair of rails mounted within the interior of the cargo space so that a user may slide the retractable cover assembly 100 in and out of the vehicle. The plurality of rollers 16a-d supports and guides the retractable cover assembly 100 as it opens and closes.

The first support frame 10 is comprised of oppositely disposed elongated support side rails 18. The side rails 18 are interconnected by a front rail 20 and a plurality of longitudinally spaced transverse support rails 22. In the illustrated embodiment, the side rails 18 are interconnected by three longitudinally spaced transverse support rails 22, although any number of support rails 22 may be used depending on the size of the overall cover assembly 100. The front rail 20 is secured between the respective ends of the side rails 18 opposite the second support frame 14.

Each of the side rails 18 are attached to the second support frame 14. Similar to the first support frame 10, the second support frame 14 is comprised of two oppositely disposed elongated support side rails 26. The side rails 26 are interconnected by a front rail 28 and a back rail 32. A center support rail 24 extends from the front rail 20 of the first support frame 10 to the back rail 32 of the second support frame 14. A plurality of brace members 30a-d may be utilized where the first support frame 10 attaches to the second support frame 14. In the illustrated embodiment, a pair of diagonal brace members 30a, 30b extend from each side rail 18 to the front rail 28 of the second support frame 14. A pair of diagonal brace members 30c, 30d also extend from the front rail 28 to each of the side rails 26 of the second support frame 14. The brace members 30a-d provide additional structural stability for the retractable cover assembly 100. As illustrated in FIGS. 1A and 1B, the shape of both the first support frame 10 and the second support frame 14 is rectangular to conform to the shape of a typical cargo space in a vehicle, such as a truck or trailer, although other shapes may be used (for instance, square).

The plurality of rollers 16a-d are operatively attached to the side rails 26 of the second support frame 14. In the illustrated embodiment, the second support frame 14 includes four rollers: two rollers (rollers 16a and 16b) attached to one side rail 26 and two rollers (rollers 16c and 16d) attached to the other side rail 26. Each set of rollers (16a, 16b and 16c, 16d) are spaced apart in a parallel fashion along the side rail with one roller positioned near the front rail 28 and the other roller positioned near the back rail 32. The rollers 16a-d are attached to the side rails 26 in a horizontal configuration. That is, the rollers 16a-d extend outwardly from a side portion of the side rail 26.

The plurality of rails and brace members used to form the first support frame 10 and the second support frame 14 may be comprised of light weight metallic tubing. The lightweight tubing provides easier deployment and retraction of the retractable cover assembly 100 and less stress on the walls of the vehicles. In some embodiments, the plurality of rails and brace members used to form the first support frame 10 and the second support frame 14 are made of aluminum tubing, such as extruded square aluminum tubing or round aluminum tubing. In some embodiments, the side rails 18, the support rails 22, the side rails 26, the front rail 20, the front rail 28, the back rail 32, and the brace members 30a-d are formed of square aluminum tubing, such as aluminum square tubing 6061-T6-extruded radius corner. In some embodiments, the various metallic tubing used to form the first support frame 10 and the second support frame 14 may be welded together to form a unitary frame. In other embodiments, the various metallic tubing used to form the first support frame 10 and the second support frame 14 may be fastened together using any type of securing mechanism, such as with bolts and nuts.

The first support frame 10 and the second support frame 14 may be sized and shaped to conform to the size and shape of the interior cargo space of the vehicle in which the retractable cover assembly 100 is mounted. That is, the first support frame 10 and the second support frame 14 may have a length and width that conforms to the length and width of the interior cargo space in which the retractable cover assembly 100 is mounted. Generally, the first support frame 10 and the second support frame 14 should have a width less than the width of the interior cargo space so that there is sufficient clearance for the rollers 16a-d to slide along the interior rail system. For example, in some embodiments, the second support frame 14 may have a width of at least about 3.5 inches less than the overall width of the interior cargo space. In further embodiments, the second support frame 14 may have a width of at least about 3.75 inches less than the overall width of the interior cargo space. In still further embodiments, the second support frame 14 may have a width of at least about 4 inches less than the overall width of the interior cargo space.

In some embodiments, the first support frame 10 has a width less than the width of the second support frame 14. For instance, the first support frame 10 may have a width of at least about 2 inches less than the width of the second support frame 14. In another embodiment, the first support frame 10 may have a width of at least about 5 inches less than the width of the second support frame 14. In still another embodiment, the first support frame 10 may have a width of at least about 10 inches less than the width of the second support frame 14. In yet another embodiment, the first support frame 10 may have a width of at least about 15 inches less than the width of the second support frame 14. In still further embodiments, the first support frame 10 and the second support frame 14 may have the same width.

In some embodiments, the second support frame 14 may have a width of about 90 inches to about 120 inches. In further embodiments, the second support frame 14 may have a width of about 92 inches to about 115 inches. In still other embodiments, the second support frame 14 may have a width of about 95 inches to about 105 inches. For instance, the second support frame 14 may have a width of about 99 inches.

In some embodiments, the first support frame 10 may have a width of about 70 inches to about 120 inches. For example, the first support frame 10 may have a width of about 80 inches to about 110 inches. In another embodiment, the first support frame 10 may have a width of about 85 inches to about 105 inches. In still other embodiments, the first support frame 10 may have a width of about 90 inches to about 102 inches. For example, the first support frame 10 may have a width of about 91 inches.

The length of the first support frame 10 and the second support frame 14 may vary depending on the length of the cargo space of the vehicle. In some embodiments, the first support frame 10 may have a length of about 80 inches to about 130 inches. In other embodiments, the first support frame 10 may have a length of about 85 inches to about 120 inches. In still other embodiments, the first support frame 10 may have a length of about 90 inches to about 110 inches. In yet other embodiments, the first support frame 10 may have a length of about 95 inches to about 105 inches. For instance, the first support frame 10 may have a length of about 96 inches.

In some embodiments, the second support frame 14 may have a length that is shorter than the length of the first support frame 10. For instance, the second support frame 14 may have a length of about 35 inches to about 60 inches. In another embodiment, the second support frame 14 may have a length of about 40 inches to about 55 inches. In still another embodiment, the second support frame 14 may have a length of about 42 inches to about 50 inches. For example, the second support frame 14 may have a length of about 48 inches.

The horizontal rails forming the first support frame 10 and the second support frame 14, for example, the front rail 20, the support rails 22, the front rail 28, and the back rail 32, may be evenly spaced apart to provide sufficient structural support for the retractable cover assembly 100. In some embodiments, the horizontal rails may be spaced about 10 inches to about 30 inches apart. In other embodiments, the horizontal rails may be spaced about 12 inches to about 28 inches apart. In still other embodiments, the horizontal rails may be spaced about 15 inches to about 26 inches apart. For example, in some embodiments, the horizontal rails may be spaced about 12 inches apart from one another.

Figure 2A:
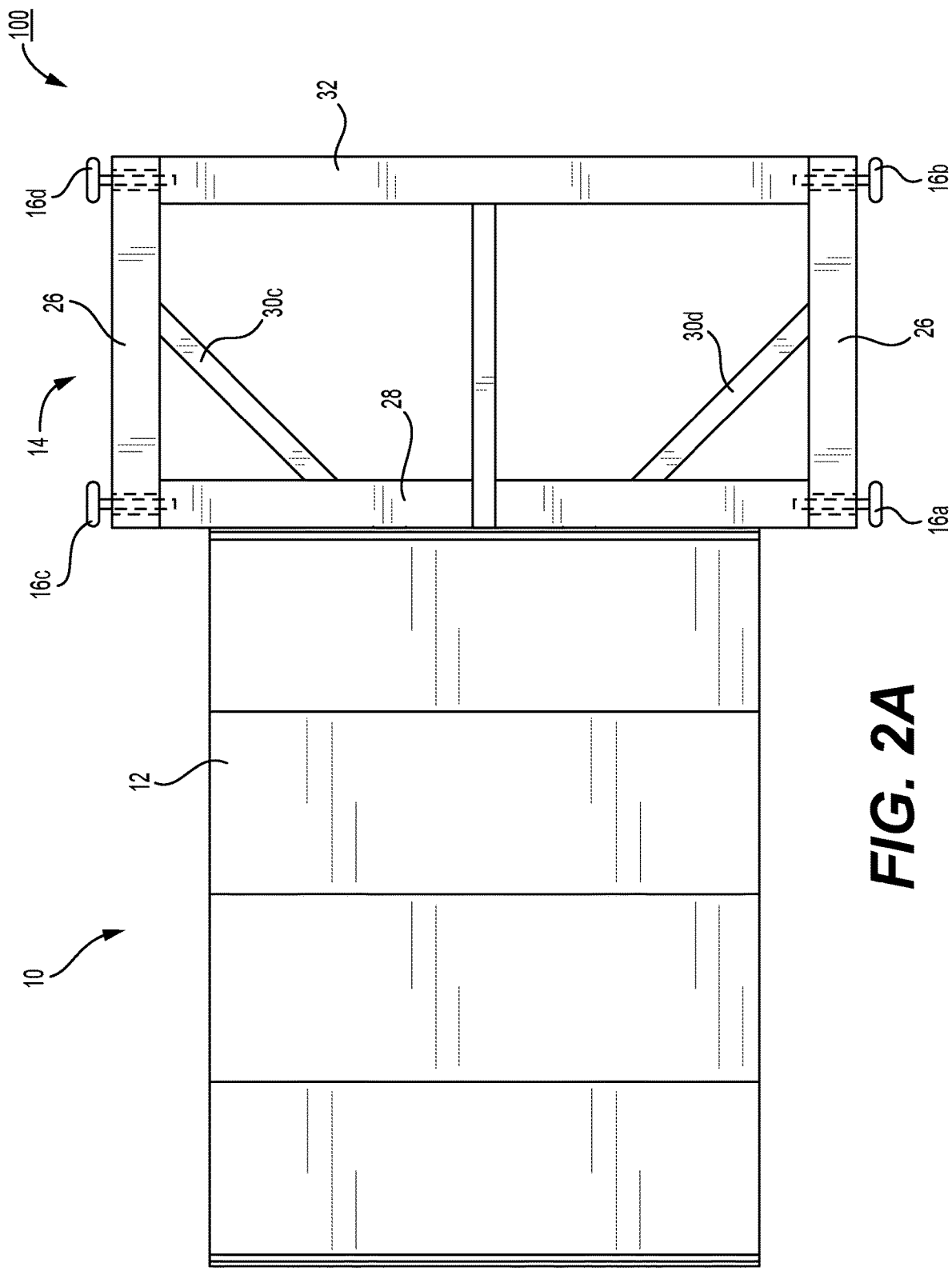
FIG. 2A is a top view of a retractable cover assembly with a covering according to one embodiment of the present disclosure.
Figure 2B:
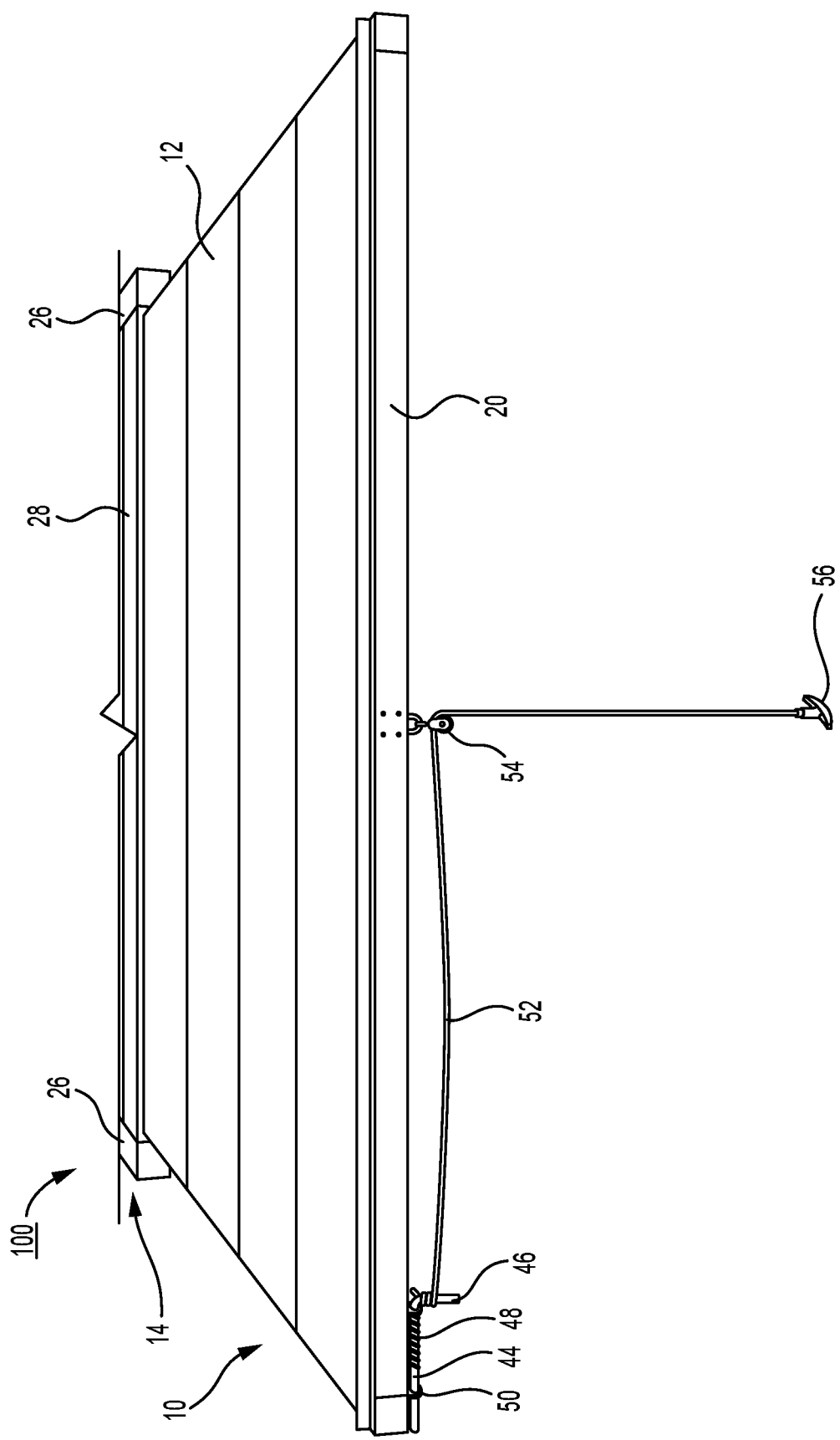
FIG. 2B is a front perspective view of the retractable cover assembly shown in FIG. 2A.

FIGS. 2A and 2B show the retractable cover assembly 100 with a covering 12 fastened thereto. As shown in FIGS. 2A and 2B, the covering 12 is fastened to an outer surface of the first support frame 10. The covering 12 is extended over the first support frame 10 and may be secured to the first support frame 10. The covering 12 is configured to cover and protect the cargo from inclement weather and debris as the cargo is loaded or unloaded from the vehicle. The covering 12 may extend at least partially over each of the side rails 18 and the front rail 20 to ensure that no openings are formed along the edges of the first support frame 10. The covering 12 may be secured to the first support frame 10 with a plurality of fasteners. Suitable fasteners include, but are not limited to, hook and loop fasteners, straps, hooks, snaps, screws, and bolts. For example, the covering 12 may be fastened to the first support frame 10 with screws. The covering 12 may be made of any suitable, flexible material such as canvas, neoprene, and various synthetic plastic materials which provide a relatively water-impenetrable and long-lasting material. In some embodiments, the covering 12 is made of canvas.

The retractable cover assembly 100 may also include a locking mechanism for securing the cover assembly 100 in the closed position (for example, when the cover assembly 100 is positioned within the interior of the cargo space). This helps prevent movement of the retractable cover assembly 100 while the vehicle is in motion. In one embodiment, as illustrated in FIG. 2B, the locking mechanism may be a cane bolt 44 having a handle 46 integrally formed therewith. The cane bolt 44 is operatively attached to the front rail 20 via a bracket 50 having a diameter slightly larger than the cane bolt 44 itself. The cane bolt 44 includes a spring 48 coupled thereto, which helps bias the cane bolt 44 between locked and unlocked positions. In use, when the cane bolt 44 is in the locked position (as shown in FIG. 2B), the cane bolt 44 is seated within a bore positioned on an adjacent surface of the vehicle, such as the interior wall of the vehicle, which prevents any horizontal movement of the rollers 16a-d. When the cane bolt 44 is unlocked, the cane bolt 44 clears the bore, which in turn, allows the retractable cover assembly 100 to slide out from the interior of the cargo space. While the locking mechanism has been described herein as a cane bolt, those of ordinary skill in the art will appreciate that any type of gate anchor or drop bolt can be used in accordance with the present disclosure. Additionally, it is to be understood that the spring is but one example of a resilient member which may be used in accordance with present disclosure. Other examples of resilient members which may be used include a leaf spring, a compressed resilient rubber, or plastic foam tube.

To aid in operating the locking mechanism (for example, the cane bolt 44) and opening the retractable cover assembly 100, a hanging cable 52 may be used to manually lock and unlock the cane bolt 44 and assist the user with pulling the retractable cover assembly 100 out from the interior of the vehicle. As shown in the illustrated embodiment of FIG. 2B, one end of the cable 52 is tied to the handle 46 of the cane bolt 44 while the other end of the cable 52 hangs below the cover assembly 100. The cable 52 may be fed through a mounting hook 54 attached at the center of the front rail 20 so that the cable 52 is more easily accessible to the user. A gripping mechanism 56 may be attached to the end of the cable 52 that hangs below the cover assembly 100. The gripping mechanism 56 may be a strap, knob, handle, or any other mechanism that allows a user to grasp onto the cable 52 and exert a force to facilitate opening and closing. In use, when a user would like to open the retractable cover assembly 100, the user may exert a force on the cable 52 (for example, pull the gripping mechanism 56) which unlocks the cane bolt 44 on the front rail 20 of the first support frame 10 and allows the second support frame 14 to slide along a pair of rails mounted in the upper interior portion of the cargo space such that the first support frame 10 with the covering 12 attached thereto fully extends outside of the vehicle to protect the cargo being loaded and/or unloaded.

Figure 3:
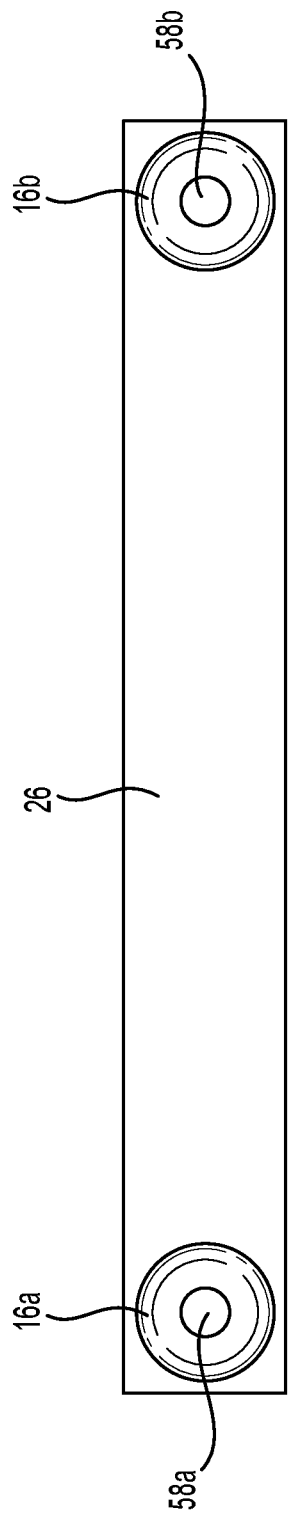
FIG. 3 is a partial side view of the retractable cover assembly according to one embodiment of the present disclosure.

FIG. 3 shows the side rail 26 with two of the rollers 16a, 16b attached thereto. As illustrated in FIG. 3, the rollers 16a, 16b are connected to the side rail 26 via axles 58a, 58b that are rotatably attached to the side rail 26. The axles 58a, 58b pass through a horizontal opening in the side rail 26 and may be secured with any suitable fasteners, such as a nut. The rollers 16a, 16b are spaced apart on the side rail 26. In some embodiments, the rollers 16a, 16b are spaced such that one roller 16a is located nearest the front rail 28 and the other roller 16b is located nearest the back rail 32. The distance in which the rollers 16a, 16b are spaced apart may vary depending on the length of the second support frame 14. In some embodiments, the rollers 16a, 16b may be spaced about 10 inches to about 48 inches apart. In other embodiments, the rollers 16a, 16b may be spaced about 15 inches to about 36 inches apart. In still other embodiments, the rollers 16a, 16b may be spaced about 20 inches to about 24 inches apart. For example, the rollers 16a, 16b may be spaced about 22 inches to about 40 inches apart. Although the embodiment shown in FIG. 3 has two rollers, more rollers may be utilized to increase the stability of the retractable cover assembly 100. The rollers may be made of any durable material. For example, the rollers may be made of nylon or polytetrafluoroethylene (PTFE).

Figure 4:
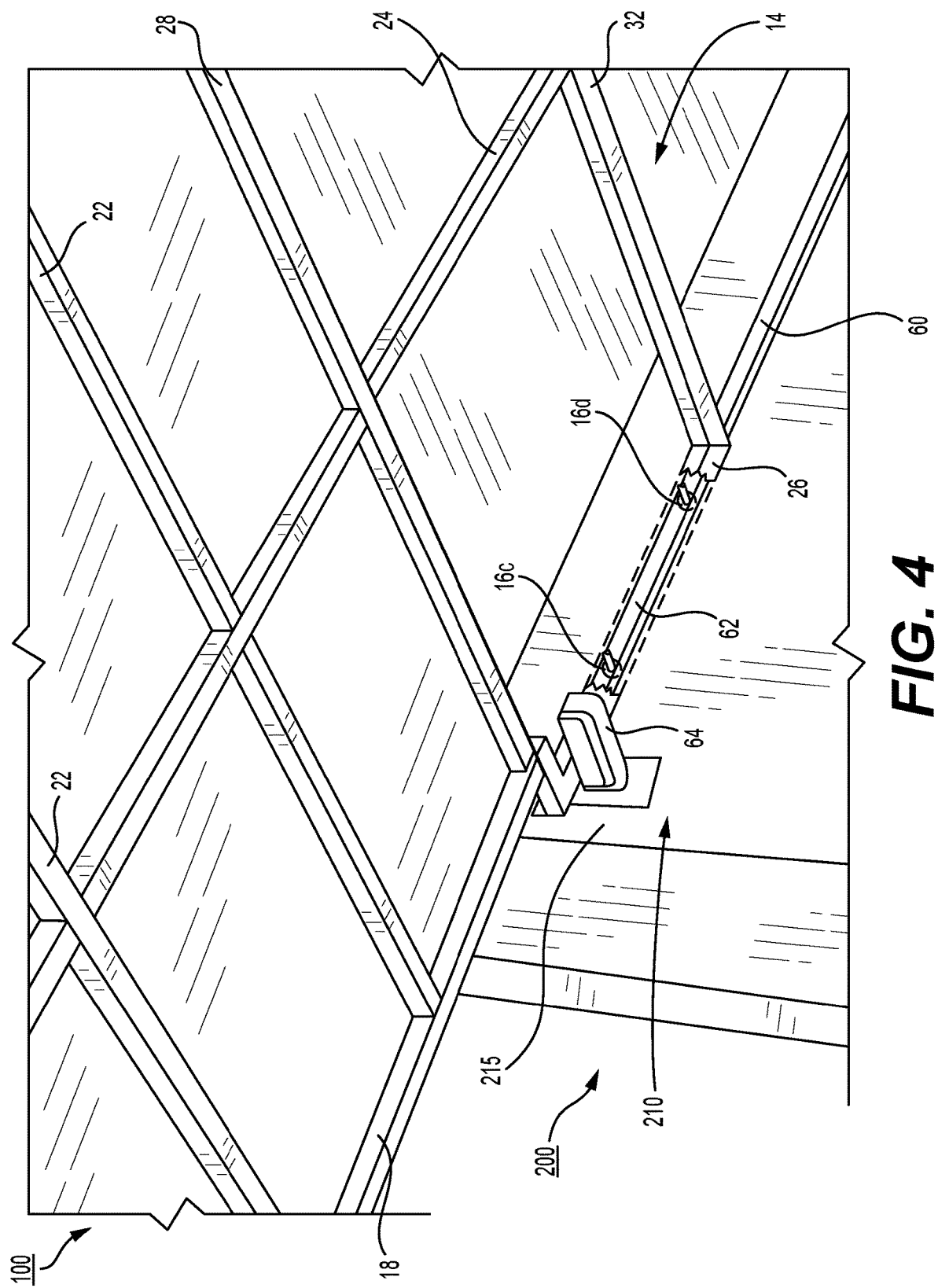
FIG. 4 is a perspective view of a rail assembly with the retractable cover assembly attached thereto according to one embodiment of the present disclosure.

FIG. 4 shows a rail assembly that facilitates sliding of the retractable cover assembly 100 along the horizontal axis according to one embodiment of the present disclosure. The rollers 16a-d are adapted for rolling engagement with a pair of parallel and spaced apart guiderails secured along opposing walls of the interior cargo space in which the cover assembly 100 is mounted so as to be capable of rolling along the length of the rails in the horizontal axis. As shown in FIG. 4, a guiderail 60 may be fixedly secured to a wall 215 within the cargo space 210 of a vehicle 200. The guiderail 60 includes an interior track 62 configured for engagement with the rollers 16c, 16d. Through the interaction of the rollers 16c, 16d, the second support frame 14 can slide along the guiderail 60 in the horizontal axis. A second parallel and spaced apart rail (not shown) may be fixedly secured to an opposing wall of the cargo space such that the opposing rollers (16a, 16b) can slide in conjunction with the rollers 16c, 16d. A support bracket 64 may be mounted to the wall 215 of the vehicle 200 and positioned directly below the guiderail 60 to provide additional stability as the retractable cover assembly 100 slides in and out of the vehicle. A second support bracket (not shown) may be mounted under the rail on the opposite wall.

Figure 5A:
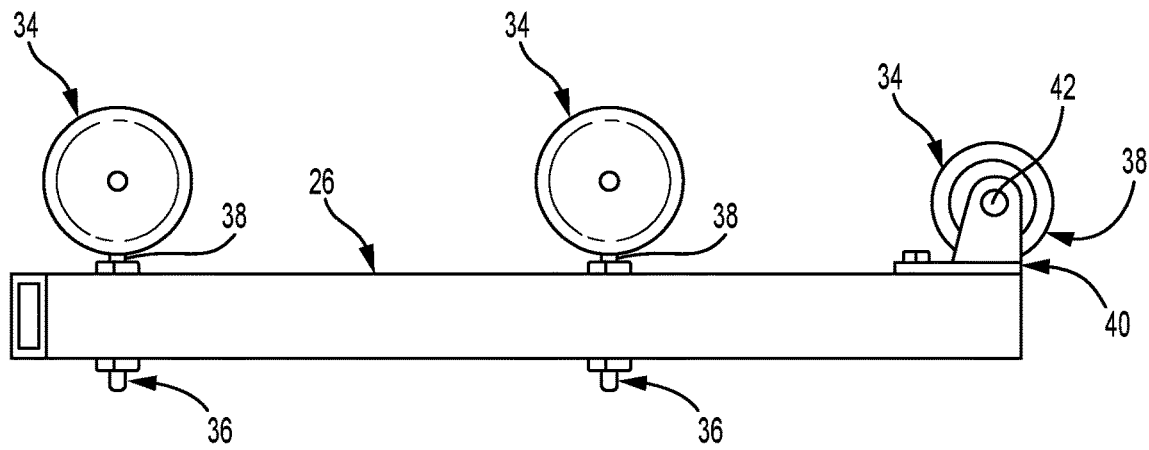
FIG. 5A is a partial side view of the retractable cover assembly according to another embodiment of the present disclosure.
Figure 5B:
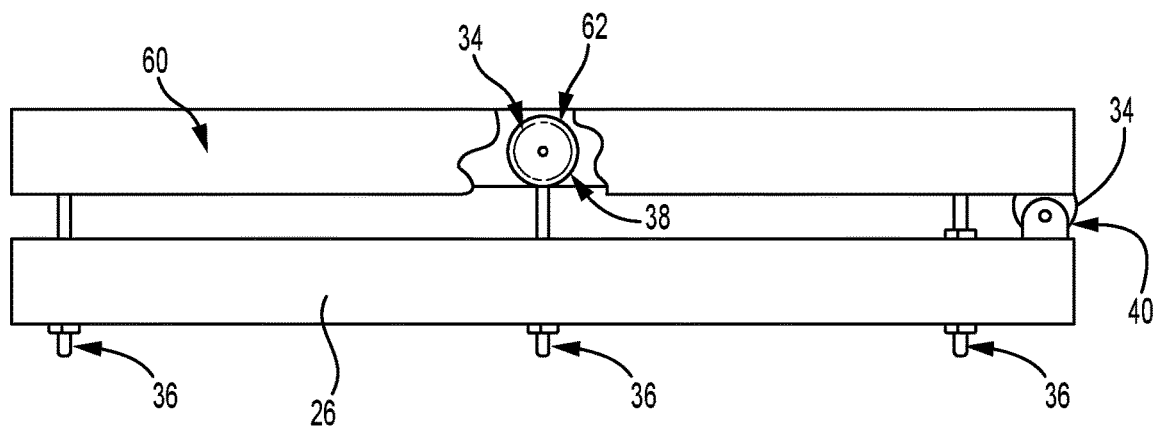
FIG. 5B is a side view of a rail assembly with the retractable cover assembly attached thereto according to another embodiment of the present disclosure.

FIGS. 5A and 5B show a plurality of rollers and rail assembly according to another embodiment of the present disclosure. In this embodiment, the retractable cover assembly 100 utilizes a plurality of rollers that are attached to the side rails 26 in a vertical configuration. That is, the rollers extend outwardly from a top portion of the side rail 26. As shown in FIG. 5A, the side rail 26 includes three rollers 34 attached in a vertical configuration. The rollers 34 are adapted to engage with the guiderail 60 so as to be capable of rolling along the length of the guiderail 60 in the horizontal axis. Each of the rollers 34 may be fixedly attached to the side rails 26 by a bolt 36, which passes through a vertical opening in the side rail 26 and through a bearing 38 of the roller 34. Although the embodiment shown in FIG. 5A has three rollers, more rollers may be utilized to increase the stability of the retractable cover assembly 100.

As illustrated in FIG. 5A, the three rollers 34 are spaced apart on the side rail 26. In some embodiments, the three rollers 34 are spaced evenly apart on the side rail 26 such that one roller is located nearest the front rail 28, another roller is located in the center of the side rail 26, and the third roller is located nearest the back rail 32. The distance in which the three rollers 34 are spaced apart may vary depending on the length of the second support frame 14. In some embodiments, the three rollers 34 may be spaced about 10 inches to about 30 inches apart. In other embodiments, the three rollers 34 may be spaced about 15 inches to about 25 inches apart. In still other embodiments, the three rollers 34 may be spaced about 20 inches to about 23 inches apart. For example, the three rollers 34 may be spaced about 22 inches apart.

In some embodiments, a bracket 40 may be used to attach the roller 34 located nearest the back rail 32 to the side rail 26. The bracket 40 may have a rectangular cross section that matches the rectangular cross section of the side rail 26. This allows for the bracket 40 to sit flush with the edge of the side rail 26. The bracket 40 has an opening 42 sized and dimensioned to receive a fastener, such as a bolt, for attaching the axle of the roller 34 to the bracket 40. The bracket 40 may be attached to the side rail 26 using any type of attachment mechanism. For instance, the bracket 40 may have one or more holes through which a screw, bolt, or nail may be inserted to attach the bracket 40 to the side rail 26.

The bracket 40 may have varying dimensions depending on the shape and size of the side rails 26 used on the second support frame 14. In some embodiments, the bracket 40 may have a length of about 2 inches to about 8 inches. In other embodiments, the bracket 40 may have a length of about 3 inches to about 6 inches. For example, the bracket 40 may have a length of about 3 inches. The bracket 40 may have a width of about 1 inch to about 4 inches. In further embodiments, the bracket 40 may have a width of about 1.5 inches to about 3 inches. For instance, the bracket 40 may have a width of about 2 inches.

The rollers 32 are adapted for rolling engagement with the pair of parallel and spaced apart rails secured along opposing walls of the interior cargo space. As shown in FIG. 5B, the rollers 32 are adapted for engagement with the track 62 of the guiderail 60. Through the interaction of the rollers 32, the second support frame 14 can slide along the guiderail 60 in the horizontal axis.

Figure 6:
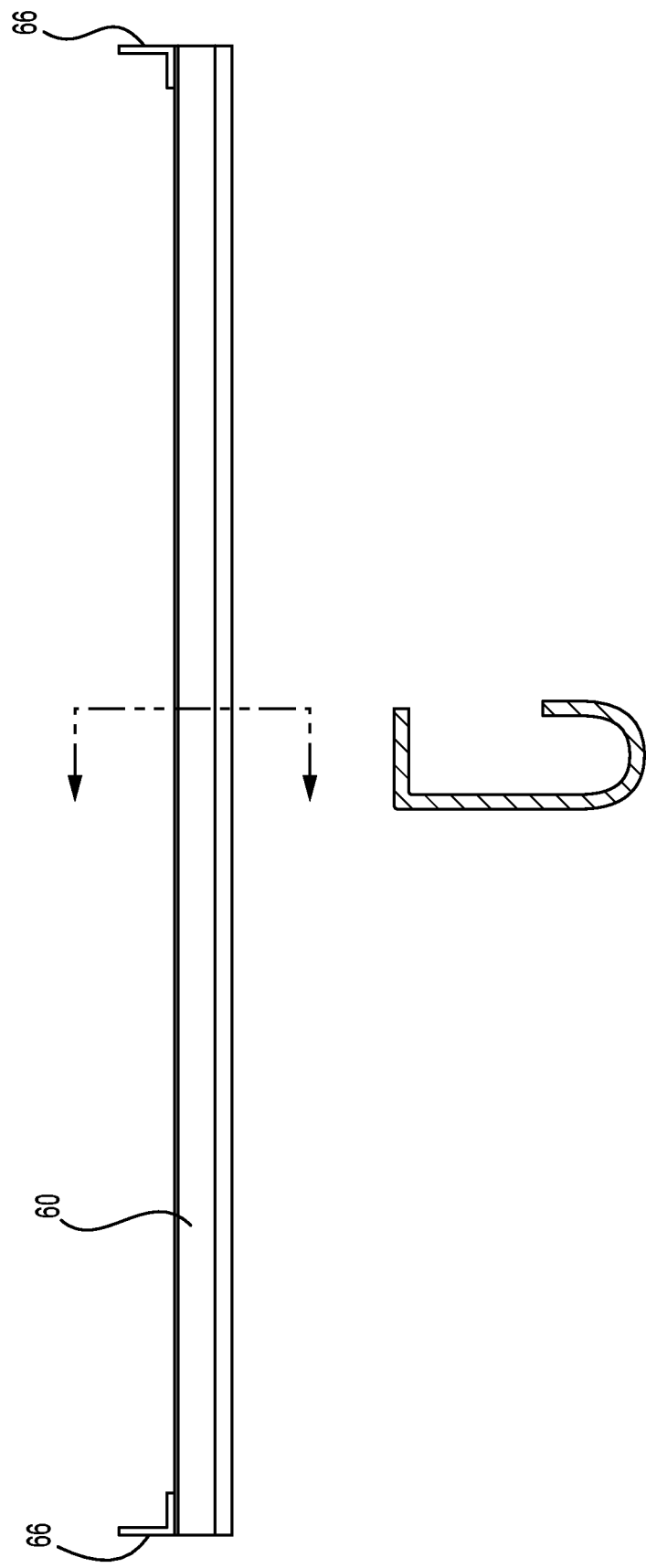
FIG. 6 is a side view of a rail according to one embodiment of the present disclosure.

FIG. 6 shows a mechanism for attaching the guiderail 60 to the wall of the vehicle according to one embodiment of the present disclosure. In one embodiment, the guiderail 60 may be fixedly attached to the wall by mounting brackets 66. As shown in FIG. 6, the mounting brackets 66 may be placed on each end of the guiderail 60 and attached to the guiderail 60 using any conventional fastener. Each mounting bracket 66 may include a plurality of mounting holes (not shown) for securing the mounting bracket 66 to the wall with screws, bolts, or other conventional means. While mounting brackets have been described herein as an exemplary mechanism for attaching the rails to the walls of the vehicle, those of ordinary skill in the art will appreciate that any other attachment mechanism may be used so long as the rails are sufficiently secured to the walls. For instance, the rail can be directly attached to the wall by drilling a plurality of holes therethrough and inserting a fastener, such as a bolt, to secure the rail to the wall.

Figure 7:
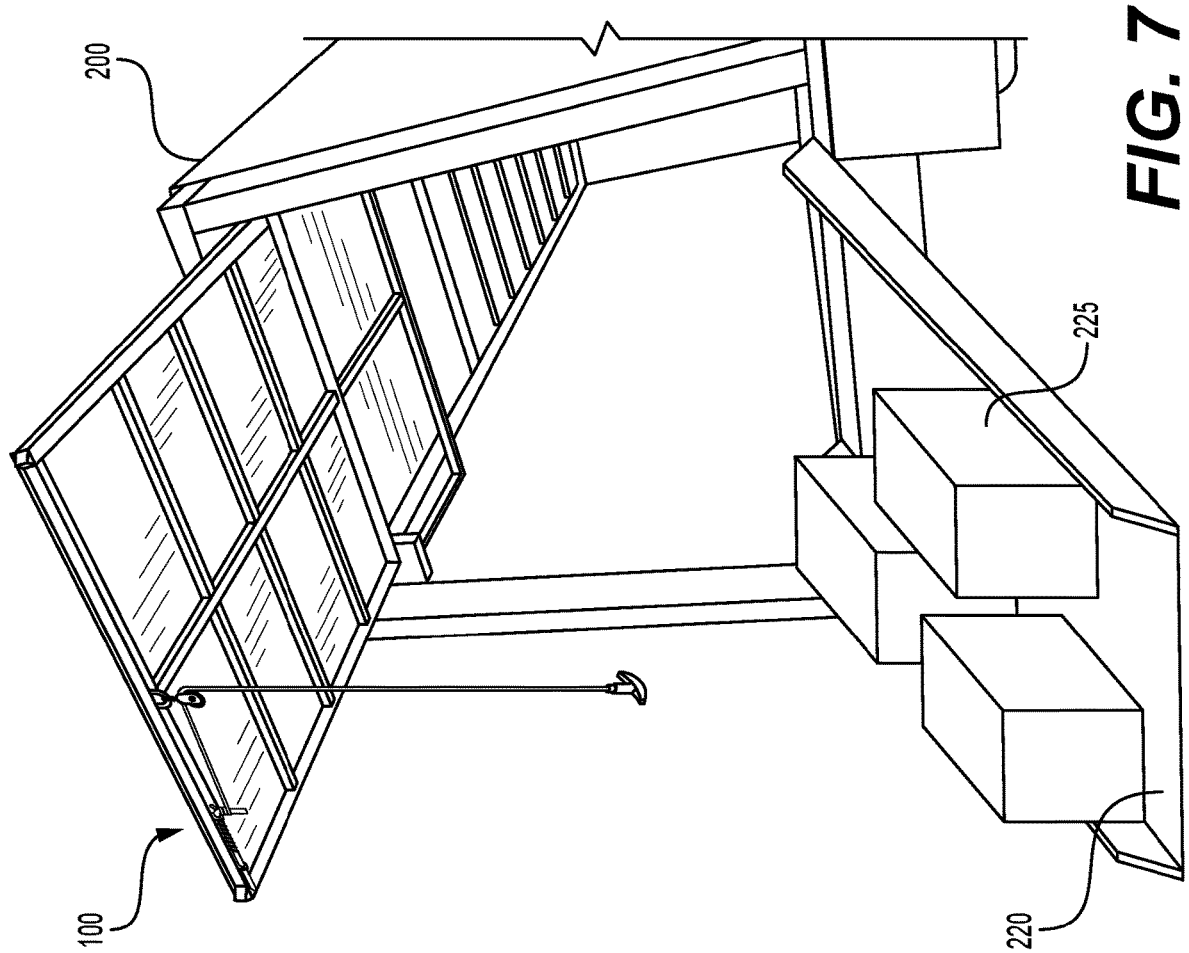
FIG. 7 is a front perspective view showing the retractable cover assembly in use on a vehicle according to one embodiment of the present disclosure.

FIG. 7 shows the retractable cover assembly 100 in use on the vehicle 200 according to one embodiment of the present disclosure. The retractable cover assembly 100 can be installed in any type of vehicle having an accessible cargo space. In some embodiments, as illustrated in FIG. 7, the retractable cover assembly 100 may be installed in a vehicle 200, such as a truck, having a lift gate 220 that helps lift heavy cargo 225 up to the opening—or gate—of the vehicle 200. The retractable cover assembly 100 can be installed in an upper interior portion of the cargo space 210 and, through the use of the plurality of rollers, can be slid out along the rail assembly to protect the cargo 225 from debris and inclement weather as it is loaded and unloaded into the vehicle 200.

The various components of the retractable cover assembly 100 described herein may be constructed or manufactured from materials, such as various polymers, plastics, stainless steel, aluminum, and combinations thereof. Similarly, the various parts described herein may be constructed according to various manufacturing methods including injection molding, milling, forging, extrusion, pressing, 3D printing, and other related manufacturing methods.

The foregoing description illustrates and describes the processes, manufactures, compositions of matter, and other teachings of the present disclosure. Additionally, the disclosure shows and describes only certain embodiments of the processes, manufactures, compositions of matter, and other teachings disclosed, but, as mentioned above, it is to be understood that the teachings of the present disclosure are capable of use in various other combinations, modifications, and environments and are capable of changes or modifications within the scope of the teachings as expressed herein, commensurate with the skill and/or knowledge of a person having ordinary skill in the relevant art. The embodiments described hereinabove are further intended to explain certain best modes known of practicing the processes, manufactures, compositions of matter, and other teachings of the present disclosure and to enable others skilled in the art to utilize the teachings of the present disclosure in such, or other, embodiments and with the various modifications required by the particular applications or uses. Accordingly, the processes, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A retractable cover assembly, comprising:
   a first support frame having a cover attached thereto, the first support frame comprising a front rail, the front rail comprising a securable bolt attached thereto and displaceable between a locked position and an unlocked position,
   a second support frame attached to the first support frame, the second support frame comprising a pair of oppositely disposed side rails, wherein each of the side rails comprises one or more rollers affixed thereto,
   a pair of parallel and spaced guiderails configured for attachment to a surface and in alignment with each of the side rails, wherein each of the guiderails are structured to receive the one or more rollers in slidable engagement, and wherein, when the securable bolt is in the unlocked position, the second support frame is configured to slide along the guiderails in a first direction associated with opening of the retractable cover assembly, and in a second direction associated with closing of the retractable cover assembly.

2. The retractable cover assembly of claim 1, wherein the securable bolt is a cane bolt, the cane bolt comprising a handle formed integrally therewith and a biasing member for biasing movement of the cane bolt along a horizontal axis.

3. The retractable cover assembly of claim 2, further comprising a cable having one end attached to the handle and another end hanging freely therefrom.

4. The retractable cover assembly of claim 3, wherein the free hanging end of the cable comprises a gripping mechanism.

5. The retractable cover assembly of claim 1, wherein each of the guiderails comprises an interior track along which the one or more rollers are slidably engaged.

6. The retractable cover assembly of claim 1, wherein the cover is made of a flexible material selected from canvas, neoprene, or a synthetic plastic material.

7. The retractable cover assembly of claim 1, wherein the first support frame comprises a pair of oppositely disposed side rails attached to the front rail and a plurality of longitudinally spaced transverse rails attached between the side rails.

8. The retractable cover assembly of claim 1, wherein the second support frame comprises a front rail and a back rail attached to the side rails.

9. A retractable cover assembly, comprising:
a first support frame having a cover attached thereto, the first support frame comprising a front rail, a pair of oppositely disposed side rails attached to the front rail, and a plurality of longitudinally spaced transverse rails attached between the side rails,
a second support frame comprising a front rail attached to the pair of oppositely disposed side rails of the first support frame, a back rail, and a pair of oppositely disposed side rails attached to the front rail of the second support frame and the back rail, wherein each of the side rails of the second support frame comprises two rollers affixed thereto and each roller is affixed to the side rail via a horizontal axle,
a pair of parallel and spaced apart guiderails configured for attachment to a surface, wherein each of the guiderails are structured to receive the rollers in slidable engagement, and
wherein the second support frame is configured to slide along the guiderails in a first direction associated with opening of the retractable cover assembly, and in a second direction associated with closing of the retractable cover assembly.

10. The retractable cover assembly of claim 9, further comprising a securable bolt attached to the front rail of the first support frame and displaceable between a locked position and an unlocked position.

11. The retractable cover assembly of claim 9, wherein the cover is made of canvas.

12. The retractable cover assembly of claim 9, wherein each of the guiderails comprises an interior track along which the rollers are slidably engaged.

* * * * *